US011944897B2

(12) United States Patent
Nishikawa et al.

(10) Patent No.: US 11,944,897 B2
(45) Date of Patent: Apr. 2, 2024

(54) DEVICE INCLUDING PLURALITY OF MARKERS

(71) Applicant: SONY INTERACTIVE ENTERTAINMENT INC., Tokyo (JP)

(72) Inventors: Kenzo Nishikawa, Tokyo (JP); Takanori Minamino, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 205 days.

(21) Appl. No.: 17/593,059

(22) PCT Filed: Mar. 11, 2020

(86) PCT No.: PCT/JP2020/010622
§ 371 (c)(1),
(2) Date: Sep. 8, 2021

(87) PCT Pub. No.: WO2020/189450
PCT Pub. Date: Sep. 24, 2020

(65) Prior Publication Data
US 2022/0184489 A1    Jun. 16, 2022

(30) Foreign Application Priority Data
Mar. 18, 2019 (JP) .................................. 2019-050039

(51) Int. Cl.
*A63F 13/213* (2014.01)
*G06F 3/01* (2006.01)
*G06F 3/03* (2006.01)

(52) U.S. Cl.
CPC ............ *A63F 13/213* (2014.09); *G06F 3/011* (2013.01); *G06F 3/0308* (2013.01)

(58) Field of Classification Search
CPC ....... G06F 3/011; G06F 3/0308; A63F 13/213
See application file for complete search history.

(56) References Cited

U.S. PATENT DOCUMENTS

| | | | |
|---|---|---|---|
| 9,746,921 B2* | 8/2017 | Mallinson | ............... G06F 3/016 |
| 2015/0258431 A1* | 9/2015 | Stafford | ............... A63F 13/212 |
| | | | 463/31 |

(Continued)

FOREIGN PATENT DOCUMENTS

| | | |
|---|---|---|
| EP | 3343320 A1 | 7/2018 |
| JP | 2007-296248 A | 11/2007 |

(Continued)

OTHER PUBLICATIONS

Notice of Reasons for Refusal dated Feb. 14, 2023, from Japanese Patent Application No. 2019-050039, 5 sheets.

(Continued)

*Primary Examiner* — David L Lewis
*Assistant Examiner* — Shauna-Kay Hall
(74) *Attorney, Agent, or Firm* — XSENSUS LLP

(57) ABSTRACT

An input device includes a case body and a plurality of markers 30d, 30e, and 30p configured to emit light to the outside of the case body. When an angle difference between the normal directions of the two markers 30d and 30e is less than a predetermined threshold value, a distance between the two markers 30d and 30e is equal to or greater than a predetermined first distance. When an angle difference between the normal directions of the two markers 30d and 30p is equal to or greater than a predetermined threshold value, a distance between the two markers 30d and 30p is equal to or greater than a predetermined second distance, and the second distance is shorter than the first distance.

7 Claims, 9 Drawing Sheets

(56) References Cited

U.S. PATENT DOCUMENTS

| | | | |
|---|---|---|---|
| 2016/0187974 A1 | 6/2016 | Mallinson | |
| 2016/0357261 A1 | 12/2016 | Bristol et al. | |
| 2017/0131767 A1* | 5/2017 | Long | A63F 13/213 |
| 2017/0173453 A1 | 6/2017 | Huang | |
| 2018/0061003 A1* | 3/2018 | Kono | G06T 3/20 |
| 2018/0190010 A1 | 7/2018 | Sawaki et al. | |
| 2018/0329484 A1 | 11/2018 | Steedly et al. | |
| 2020/0342621 A1* | 10/2020 | Nishikawa | G06V 40/28 |

FOREIGN PATENT DOCUMENTS

| | | |
|---|---|---|
| JP | 2016532178 A | 10/2016 |
| JP | 2017516187 A | 6/2017 |
| JP | 2018-045338 A | 3/2018 |
| WO | 2017/213818 A1 | 12/2017 |

OTHER PUBLICATIONS

The extended European Search Report dated Nov. 25, 2022, from European Patent Application No. 20774146.3, 10 sheets.
International Search Report and Written Opinion dated Jun. 9, 2020, from PCT/JP2020/010622, 8 sheets.

* cited by examiner

14

DEVICE INCLUDING PLURALITY OF MARKERS

TECHNICAL FIELD

The present invention relates to a device including a plurality of markers.

BACKGROUND ART

PTL 1 discloses a game device that acquires a frame image obtained by imaging a space in front of the game device, that estimates, from the position of a light emitting diode (LED) image of a game controller in the frame image, position information and posture information regarding the game controller in a real space, and that reflects the estimated position information and/or posture information on the processing of a game application.

CITATION LIST

Patent Literature

[PTL 1]
Japanese Patent Laid-open No. 2007-296248

SUMMARY

Technical Problem

A head-mounted display (HMD) is fitted to the head of a user to provide the user with a virtual reality (VR) video space. The user who wears the HMD operates operation buttons in an input device and can thereby produce various inputs to the video space.

In recent years, techniques for tracking the position and posture of a device to reflect information obtained, on a three-dimensional (3D) model in a VR space, have widely been used. The movement of a player character or a game object in a game space is synchronized with changes in the position and posture of a device to be tracked, and thus an intuitive operation by a user is realized. A plurality of markers such as light emitting elements are used for the tracking of the device, an image obtained by imaging the plurality of markers is analyzed, and the positions of marker images within the image are thus identified, with the result that the position and posture of the device in a real space are estimated. In order to track the position and posture of the device with a high degree of accuracy, it is necessary to accurately identify the positions of the marker images within the image obtained by imaging the device.

Hence, an object of the present invention is to provide a device in which a plurality of markers are arranged to realize highly accurate tracking. Note that, while the device may be an input device that includes operation buttons, the device may be a device that is simply a target to be tracked including no operation members.

Solution to Problem

In order to solve the problem described above, a device according to an aspect of the present invention includes a case body and a plurality of markers configured to emit light to the outside of the case body, and when an angle difference between the normal directions of two markers is less than a predetermined threshold value, a distance between the two markers is equal to or greater than a predetermined distance.

DESCRIPTION OF EMBODIMENT

Figure 1:
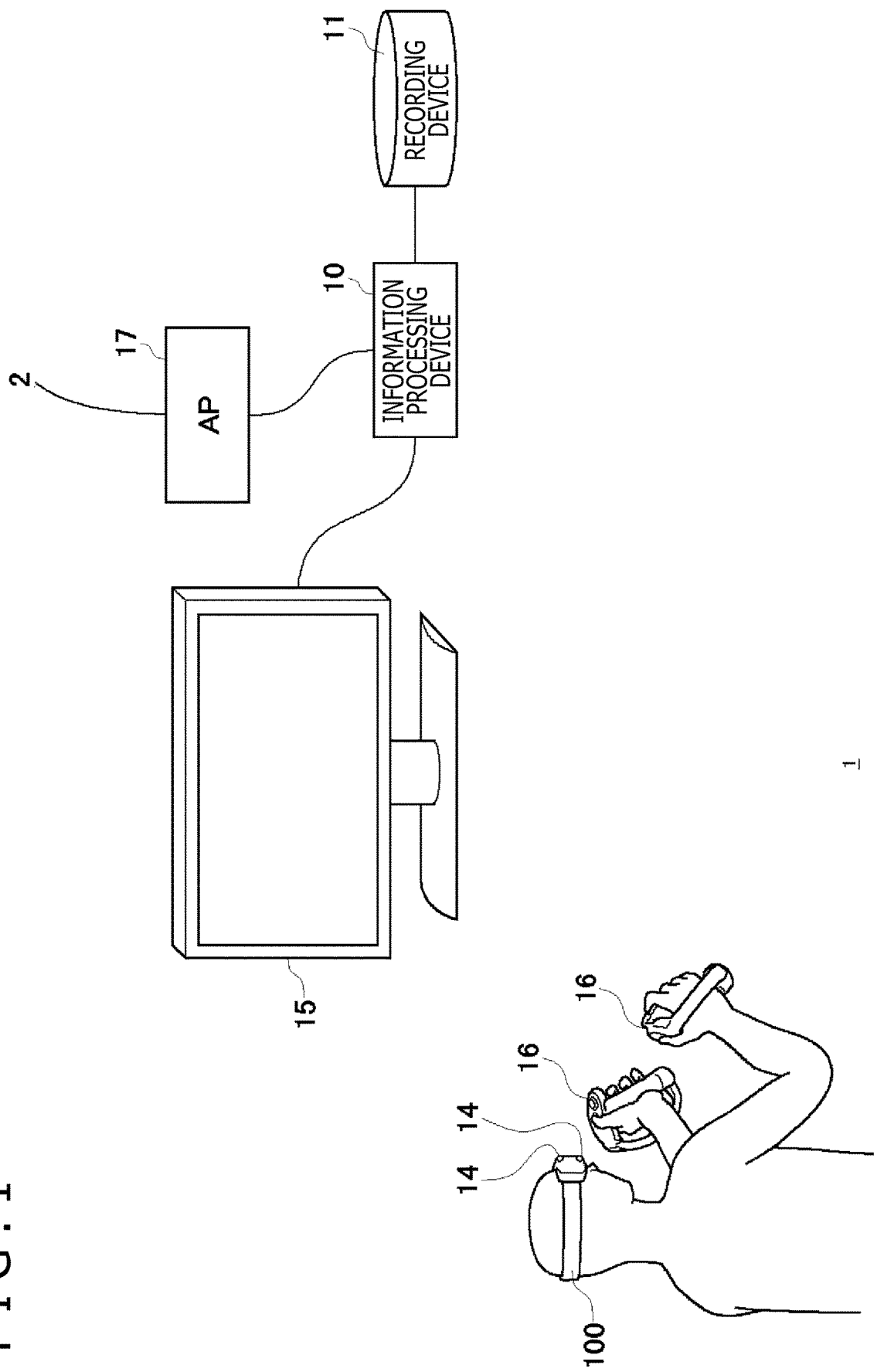
FIG. 1 is a diagram depicting an example of the configuration of an information processing system in an embodiment.

FIG. 1 depicts an example of the configuration of an information processing system 1 in an embodiment. The information processing system 1 includes an information processing device 10, a recording device 11, an HMD 100, an input device 16 that is operated with fingers of a user, and an output device 15 that outputs images and sounds. The output device 15 may be a television set. The information processing device 10 is connected through an access point (AP) 17 to an external network 2 such as the Internet. The AP 17 has the functions of a wireless access point and a router, and the information processing device 10 may be connected to the AP 17 with a cable or may be connected thereto with a known wireless communication protocol.

The recording device 11 records system software and applications such as game software. The information processing device 10 may download the game software to the recording device 11 from a content server through the network 2. The information processing device 10 executes the game software and supplies image data and sound data of the game to the HMD 100. The information processing device 10 and the HMD 100 may be connected to each other with a known wireless communication protocol or may be connected to each other with a cable.

The HMD 100 is a display device that is fitted to the head by the user, to display images on display panels located in front of the eyes. The HMD 100 individually displays an image for the left eye on a display panel for the left eye and an image for the right eye on a display panel for the right eye. These images form parallax images seen from left and right eyepoints to realize a stereoscopic view. In order for the user to look at the display panels through optical lenses, the information processing device 10 supplies, to the HMD 100, parallax image data obtained by correcting optical distortion caused by the lenses.

Although the output device 15 is not needed for the user who wears the HMD 100, preparing the output device 15 enables another user to see the display image of the output device 15. While the information processing device 10 may display, on the output device 15, the same image as the image seen by the user who is wearing the HMD 100, another image may be displayed. For example, when the user who is wearing the HMD 100 plays a game together with another user, a game image from the eyepoint of a character of the other user may be displayed from the output device 15.

The information processing device 10 and the input device 16 may be connected to each other with a known wireless communication protocol or may be connected to each other with a cable. The input device 16 includes a plurality of operation members such as operation buttons, and the user operates the operation members with the fingers while grasping the input device 16. When the information processing device 10 executes a game, the input device 16 is used as a game controller. The input device 16 is provided with a posture sensor including a three-axis acceleration sensor and a three-axis gyro sensor, and transmits sensor data to the information processing device 10 at a predetermined cycle (for example, 1600 Hz).

The game of the embodiment handles not only the operation information of the operation members in the input device 16 but also the operation information of the position, the posture, the movement, and the like of the input device 16, and reflects the operation information on the movement of the player character within a virtual three-dimensional space. For example, the operation information of the operation members may be used as information for moving the player character, and the operation information of the position, the posture, the movement and the like of the input device 16 may be used as information for moving an arm of the player character. For example, in a battle scene within the game, the movement of the input device 16 is reflected on the movement of the player character holding a weapon, and thus an intuitive operation by the user is realized, with the result that the immersion of the user in the game is enhanced.

In order to track the position and posture of the input device 16, a plurality of markers (light emitting portions) that can be imaged with image sensing devices 14 mounted on the HMD 100 are provided on the input device 16. The information processing device 10 analyzes an image obtained by imaging the input device 16, to estimate the position information and posture information of the input device 16 in a real space, and provides the estimated position information and posture information to the game.

On the HMD 100, a plurality of image sensing devices 14 are mounted. The plurality of image sensing devices 14 are attached to different positions of the front surface of the HMD 100 with different postures such that the overall imaging range obtained by adding up the imaging ranges of the image sensing devices 14 includes the entire field of view of the user. The image sensing device 14 is preferably an image sensor that can acquire the images of the plurality of markers in the input device 16. For example, when the marker emits visible light, the image sensing device 14 includes a visible light sensor, such as a charge coupled device (CCD) sensor or a complementary metal oxide semiconductor (CMOS) sensor, that is used in a general digital video camera. When the marker emits invisible light, the image sensing device 14 includes an invisible light sensor. The plurality of image sensing devices 14 image a space in front of the user at a synchronized timing and predetermined intervals (for example, 60 frames/second), and transmit image data obtained by imaging the input device 16 to the information processing device 10.

The information processing device 10 identifies the positions of a plurality of marker images of the input device 16 included in a captured image. Note that, while the one input device 16 may be imaged with a plurality of image sensing devices 14 at the same timing, since the attachment positions and attachment postures of the image sensing devices 14 are known, in such a case, the information processing device 10 combines a plurality of captured images to identify the positions of the marker images.

The three-dimensional shape of the input device 16 and the position coordinates of the plurality of markers arranged on the surface thereof are known, and thus, the information processing device 10 estimates the position coordinates and the posture of the input device 16, based on the distribution of the marker images within the captured image. The position coordinates of the input device 16 may be position coordinates in a three-dimensional space with a reference position being an origin, and the reference position may be position coordinates (longitude and latitude) set before the start of the game.

Note that the information processing device 10 can also estimate the position coordinates and the posture of the input device 16 by using the sensor data detected with the posture sensor in the input device 16. Hence, the information processing device 10 of the embodiment uses the result of the estimation based on the captured image obtained with the image sensing devices 14 and the result of the estimation based on the sensor data, so as to perform tracking processing on the input device 16 with a high degree of accuracy.

Figure 2:
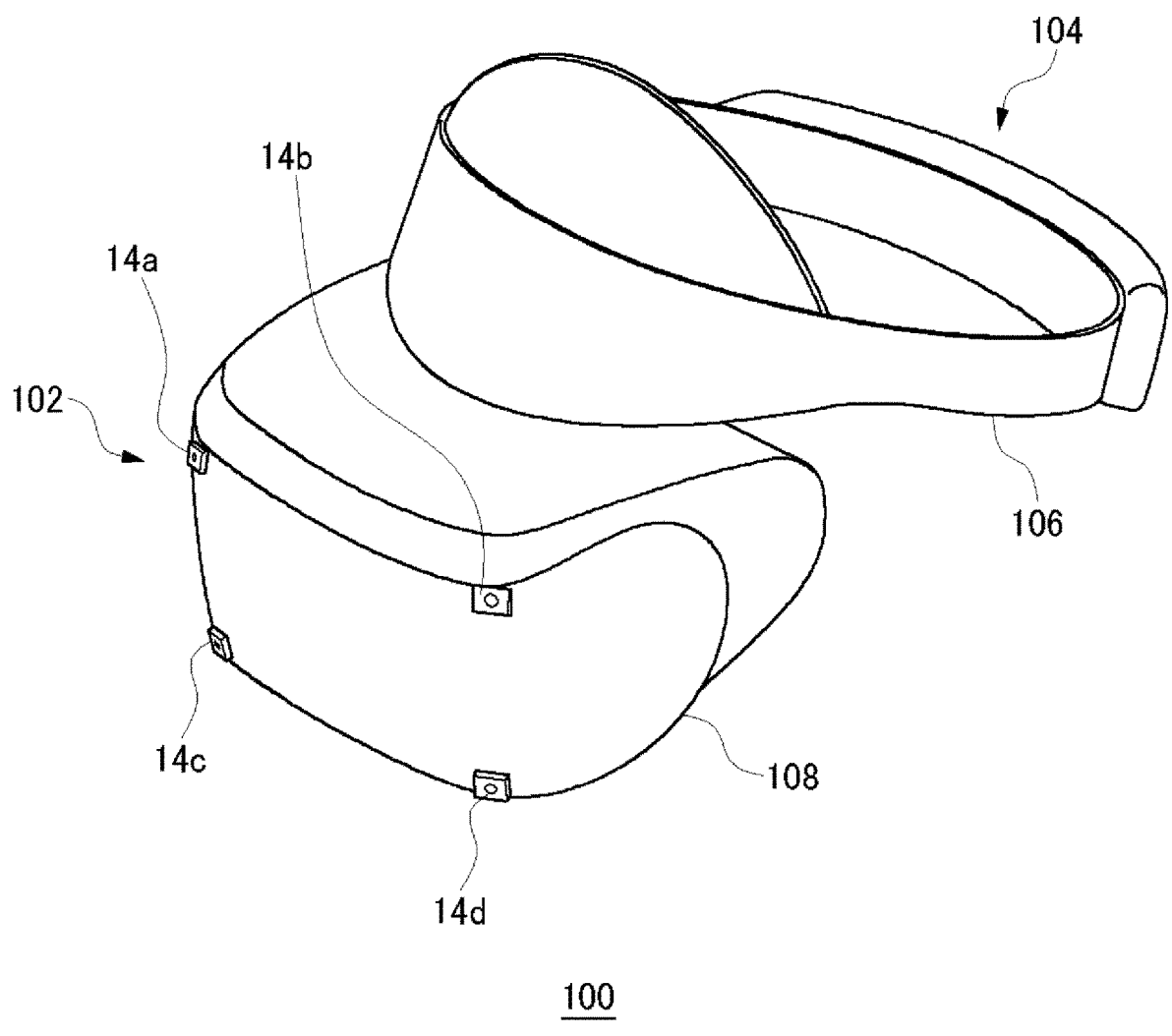
FIG. 2 is a diagram depicting an example of the external shape of an HMD.

FIG. 2 depicts an example of the external shape of the HMD 100. The HMD 100 includes an output mechanism portion 102 and a fitting mechanism portion 104. The fitting mechanism portion 104 includes a fitting band 106 that is put on by the user to be worn around the head so as to fix the HMD 100 to the head. The fitting band 106 has a material or a structure in which the length thereof can be adjusted according to the head circumference of the user.

The output mechanism portion 102 includes a housing 108 having a shape that covers the left and right eyes in a state where the user is wearing the HMD 100, and also includes, therewithin, the display panels directly opposite the eyes when the HMD 100 is worn. The display panel may be a liquid crystal panel, an organic electroluminescence (EL) panel, or the like. Within the housing 108, a pair of left and right optical lenses that are located between the display panels and the eyes of the user to enlarge the viewing angle of the user are further included. The HMD 100 may further include speakers and earphones in positions corresponding to the ears of the user or may be configured such that external headphones are connected thereto.

A plurality of image sensing devices 14a, 14b, 14c, and 14d are provided on an outer surface on the forward side of the housing 108. With reference to the direction of the line of sight of the user, the image sensing device 14a is attached to an upper right corner of the outer surface on the forward side such that a camera optical axis is directed diagonally upward to the right, the image sensing device 14b is attached to an upper left corner of the outer surface on the forward side such that the camera optical axis is directed diagonally upward to the left, the image sensing device 14c is attached to a lower right corner of the outer surface on the forward side such that the camera optical axis is directed diagonally downward to the right, and the image sensing device 14d is attached to a lower left corner of the outer surface on the forward side such that the camera optical axis is directed diagonally downward to the left. A plurality of image sensing devices 14 are installed in this way, and thus, the overall imaging range obtained by adding up the imaging ranges of the image sensing devices 14 includes the entire field of view of the user. The field of view of the user described above may be the field of view of the user in a virtual three-dimensional space.

The HMD 100 transmits, to the information processing device 10, the sensor data detected with the posture sensor and the image data obtained by imaging by the image sensing devices 14, and receives game image data and game sound data generated in the information processing device 10.

Figure 3:
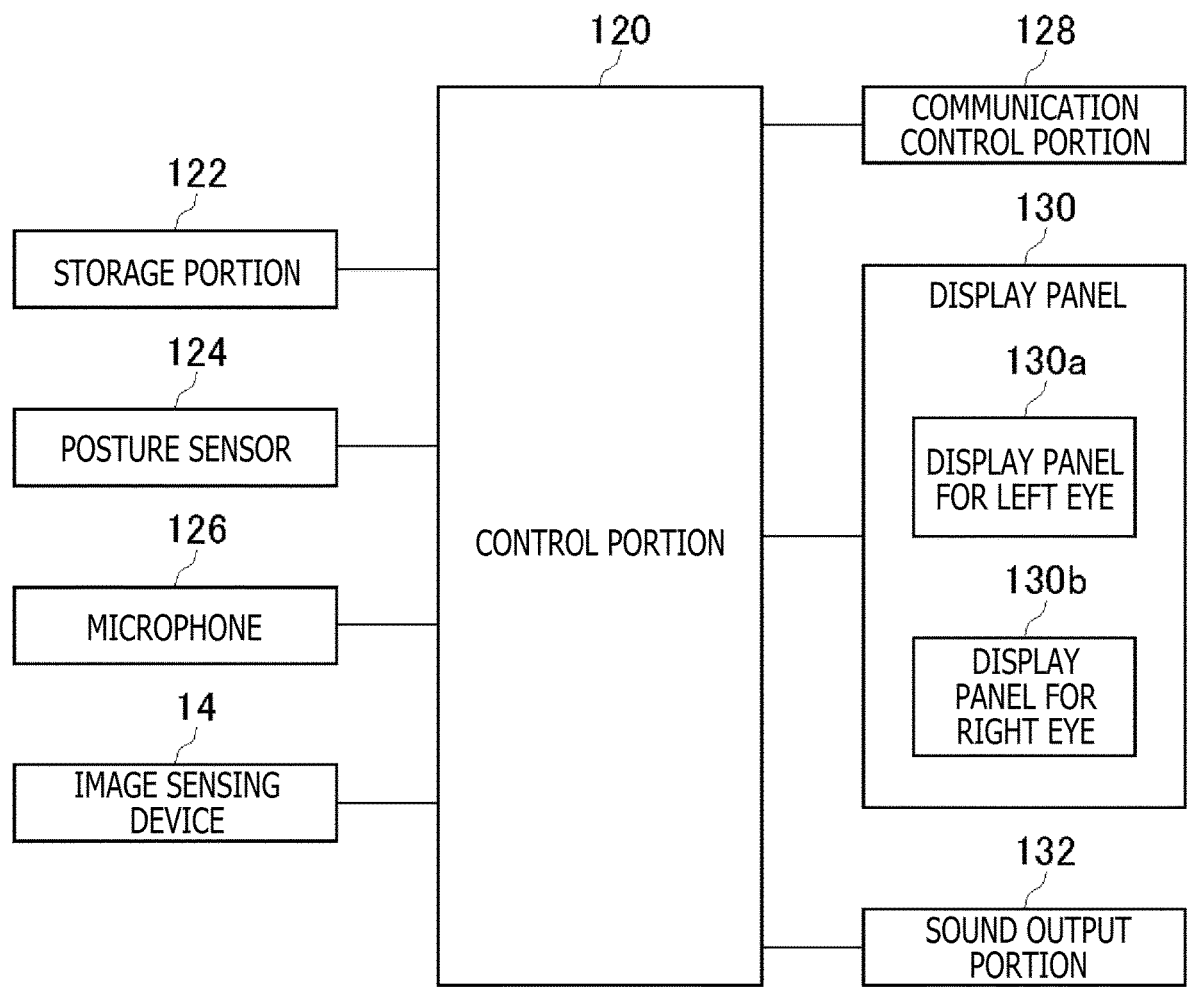
FIG. 3 is a diagram depicting a functional block of the HMD.

FIG. 3 depicts a functional block of the HMD 100. A control portion 120 is a main processor that processes and outputs various types of data such as the image data, the sound data, and the sensor data and commands. A storage portion 122 temporarily stores the data, the commands, and the like processed by the control portion 120. The posture sensor 124 acquires the sensor data regarding the movement of the HMD 100. The posture sensor 124 includes at least a three-axis acceleration sensor and a three-axis gyro sensor.

A communication control portion 128 transmits data output from the control portion 120, to the external information processing device 10 through a network adapter or an antenna by wired or wireless communication. In addition, the communication control portion 128 receives data from the information processing device 10, and outputs it to the control portion 120.

When the control portion 120 receives the game image data or the game sound data from the information processing device 10, the control portion 120 supplies the game image data to the display panel 130 and makes the display panel 130 display the image or supplies the game sound data to a sound output portion 132 and makes the sound output portion 132 output the sound. The display panel 130 includes the display panel for the left eye 130*a* and the display panel for the right eye 130*b*, and a pair of parallax images are displayed on the display panels. Further, the control portion 120 causes the sensor data from the posture sensor 124, the sound data from a microphone 126, and captured image data from the image sensing devices 14 to be transmitted from the communication control portion 128 to the information processing device 10.

Figure 4:
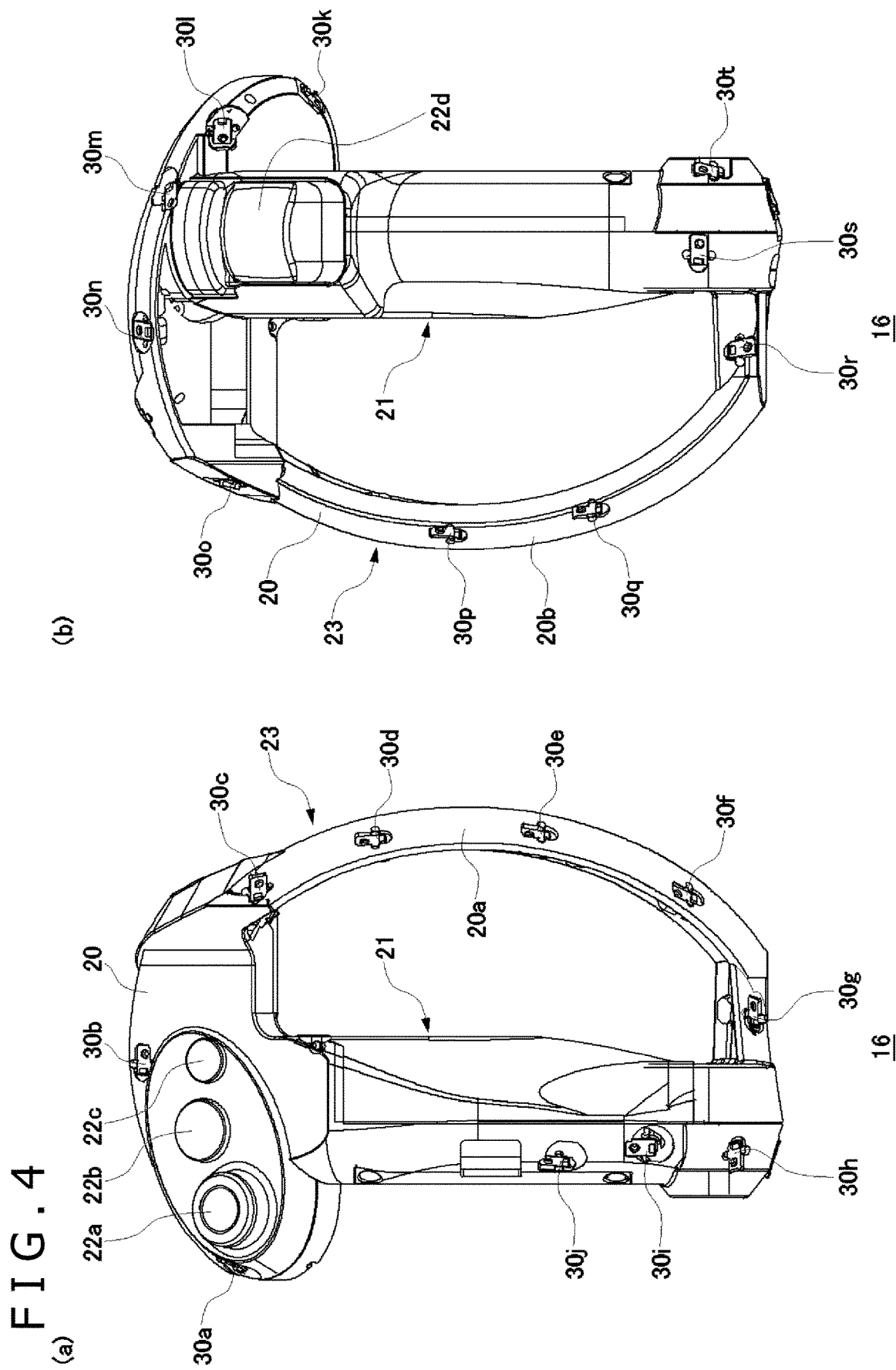
FIG. 4 depicts diagrams illustrating the external shape of an input device.

FIG. 4 depicts the external shape of the input device 16. FIG. 4(*a*) depicts the front shape of the input device 16, and FIG. 4(*b*) depicts the back shape of the input device 16. The input device 16 includes a case body 20, a plurality of operation members 22*a*, 22*b*, 22*c*, and 22*d* (hereinafter referred to as the "operation members 22" when they are not particularly distinguished) operated by the user, and a plurality of markers 30*a* to 30*t* (hereinafter referred to as the "markers 30" when they are not particularly distinguished) for emitting light to the outside of the case body 20. The operation members 22 are arranged on the head of the case body 20, and include an analog stick for performing a tilt operation, a press button, a trigger button for inputting a pulled amount, and the like.

The case body 20 includes a grasping portion 21 and a curved portion 23 that couples a case body head portion and a case body bottom portion, and the user passes fingers ranging from the index finger to the little finger between the grasping portion 21 and the curved portion 23 so as to grasp the grasping portion 21. In a state where the user grasps the grasping portion 21, the user operates the operation members 22*a*, 22*b*, and 22*c* with the thumb and operates the operation member 22*d* with the index finger. Although the markers 30*h*, 30*i*, and 30*j* are provided on the grasping portion 21, they are arranged in such positions that they are not hidden by the hand even in a state where the user grasps the grasping portion 21. At least one or more markers 30 are provided on the grasping portion 21, thus enhancing the accuracy of tracking.

The marker 30 is a light emitting portion that emits light to the outside of the case body 20, and the marker 30 may constantly emit light while being tracked. The marker 30 includes a light emitting element such as an LED and a resin portion that covers the light emitting element to diffusely emit light to the outside. Note that the marker 30 may be configured to emit light guided by a light guide member such as a light guide pipe to the outside. In this case, the light emitting element such as an LED may be connected to the incident port of the light guide member, and the marker 30 may include the emission port of the light guide member and a resin portion that covers the emission port to diffusely emit light to the outside.

Figure 5:
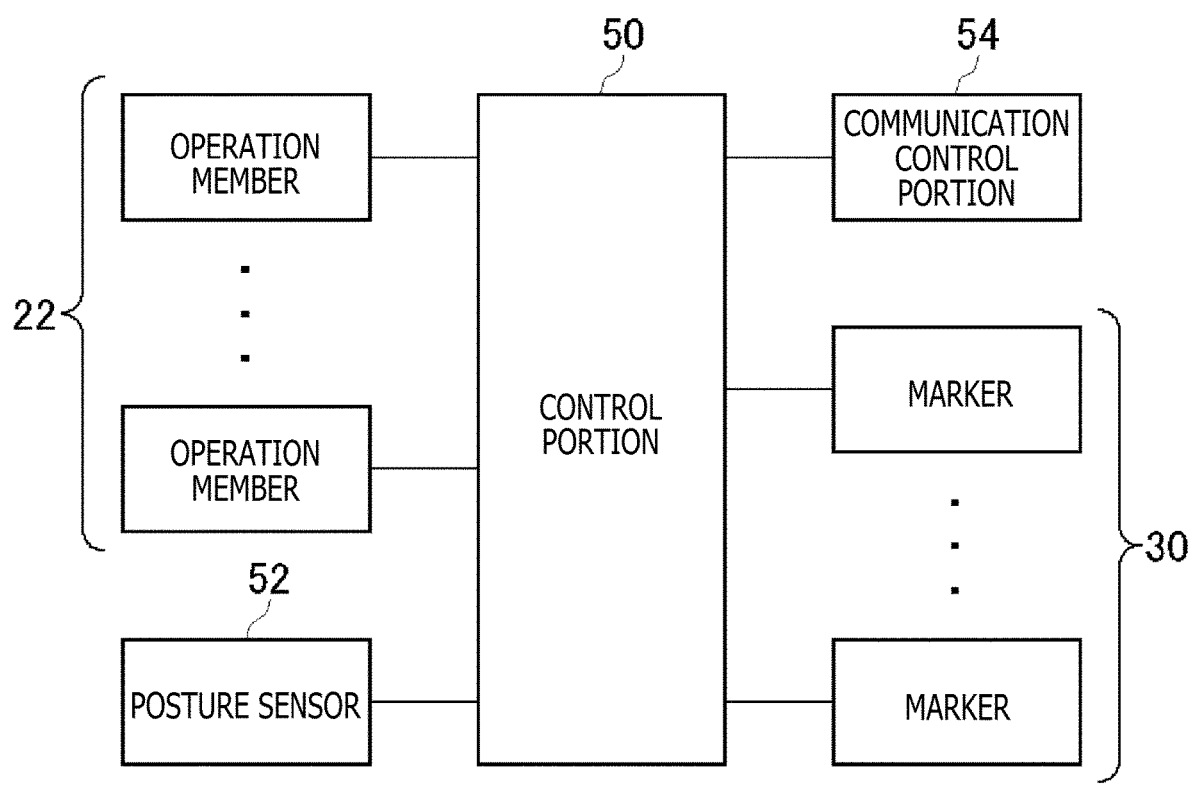
FIG. 5 is a diagram depicting a functional block of the input device.

FIG. 5 depicts a functional block of the input device 16. A control portion 50 receives operation information that is input to the operation members 22, and also receives sensor data acquired with a posture sensor 52. The posture sensor 52 acquires the sensor data regarding the movement of the input device 16, and includes at least a three-axis acceleration sensor and a three-axis gyro sensor. The control portion 50 supplies, to a communication control portion 54, the operation information and the sensor data that are received. The communication control portion 54 transmits the operation information and the sensor data output from the control portion 50, to the information processing device 10 through a network adapter or an antenna by wired or wireless communication. Further, the communication control portion 54 may acquire an instruction to emit light from the information processing device 10. The control portion 50 emits light from a plurality of markers 30, based on the instruction to emit light supplied from the information processing device 10.

Figure 6:
FIG. 6 is a diagram depicting an example of part of an image obtained by imaging the input device.

FIG. 6 depicts an example of part of an image obtained by imaging the input device 16. As illustrated in the figure, the captured image includes the images of the markers 30 that emit light. In the HMD 100, the communication control portion 128 transmits the image data obtained by imaging by the image sensing devices 14 to the information processing device 10, and the information processing device 10 extracts the images of the markers 30 from the image data. Since the three-dimensional shape of the input device 16 and the position coordinates of the plurality of markers 30 arranged on the surface thereof are known, the information processing device 10 solves a Perspective n-Point (PnP) problem by the distribution of the images of the markers 30 within the imaging image so as to estimate the position and posture of the input device 16 with respect to the image sensing devices 14.

In order for the information processing device 10 to solve the PnP problem, it is assumed that, in whatever posture the input device 16 is imaged, the marker images are accurately identified within the captured image. Hence, it is necessary to appropriately design the arrangement of the plurality of markers 30 in the input device 16.

Figure 7:
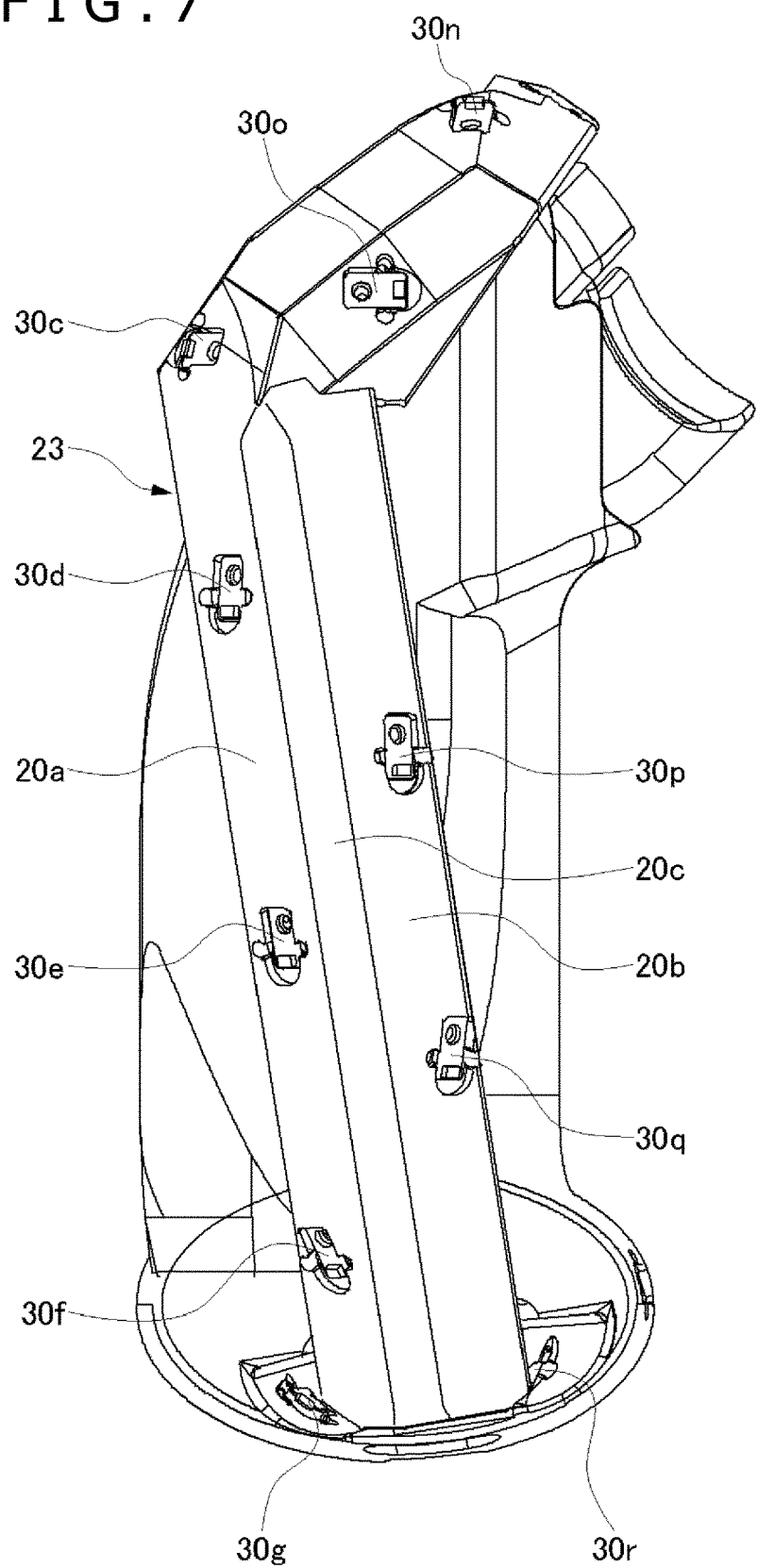
FIG. 7 is a diagram depicting the shape of a right side surface of the input device.

FIG. 7 depicts the shape of a right side surface of the input device 16. As illustrated in the figure, the curved portion 23 has a ridge surface 20*c* in its center, and has a first surface 20*a* and a second surface 20*b* on both sides thereof. The ridge surface 20*c*, the first surface 20*a*, and the second surface 20*b* are each formed as curved surfaces that bulge outward when seen from the center portion of the input device 16, and the markers 30*c*, 30*d*, 30*e*, and 30*f* are provided on the first surface 20*a* while the markers 30*p* and 30*q* are provided on the second surface 20*b*.

Figure 8:
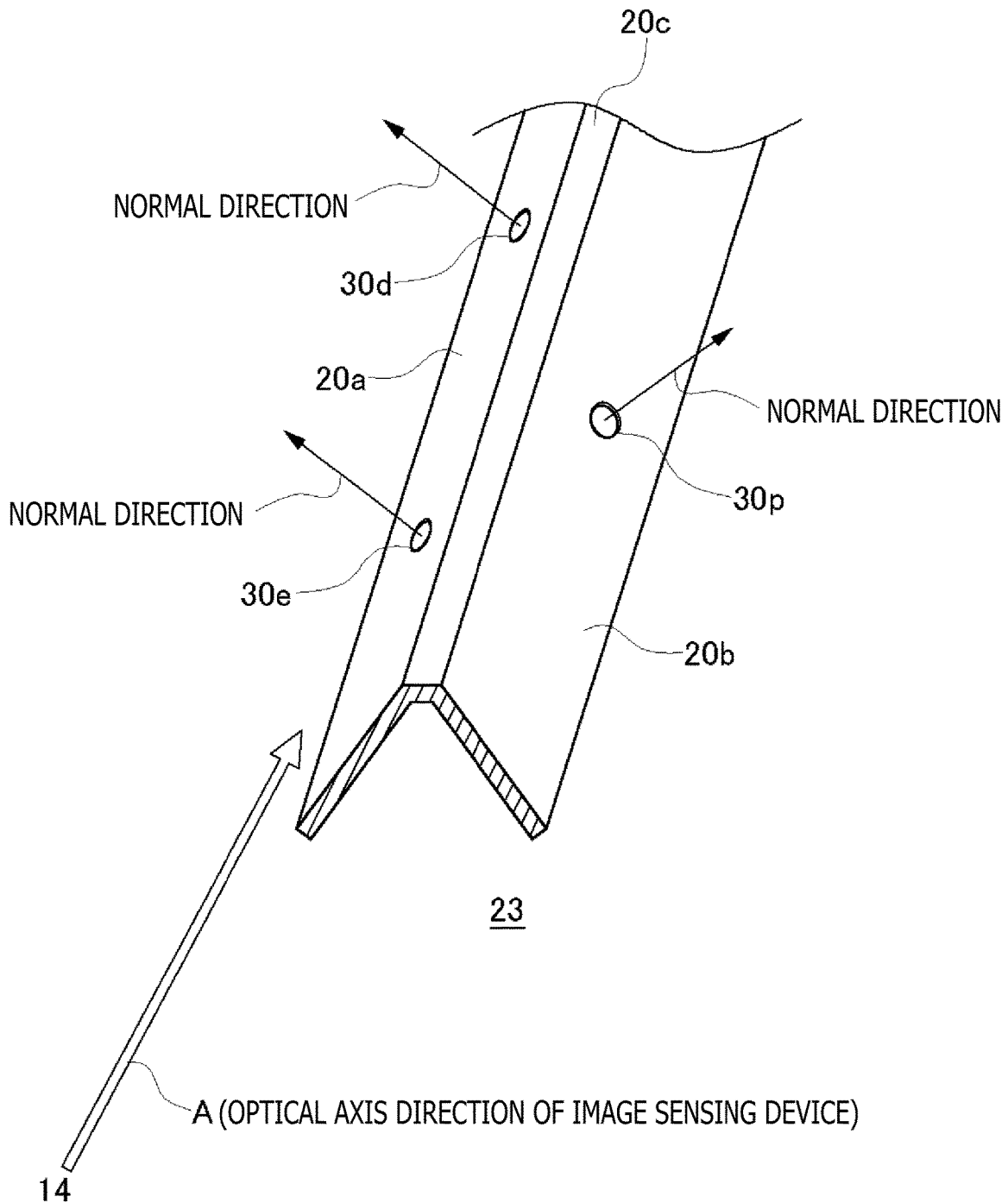
FIG. 8 is a diagram depicting a schematic configuration of a curved portion.

FIG. 8 depicts a schematic configuration of the curved portion. An arrow A indicates the optical axis direction of the image sensing device 14. When the image sensing device 14 images the input device 16 in the posture in which the optical axis direction of the image sensing device 14 is substantially parallel to the first surface 20a, the marker 30d and the marker 30e provided on the first surface 20a are imaged in a state of being close to each other. Since the image sensing device 14 images the side of the first surface 20a but not the side of the second surface 20b, the marker 30p is not imaged.

At this time, since the information processing device 10 cannot distinguish between the two marker images within the captured image, the information processing device 10 may erroneously recognize the two marker images as one marker image. In such a case, the information processing device 10 cannot correctly solve the PnP problem, and thus the information processing device 10 fails in the estimation of the position and posture of the input device 16.

The present inventors have conducted various simulations and experiments to find that this failure was caused by the fact that the image of the marker 30d and the image of the marker 30e were excessively close to each other within the imaging image and to obtain such findings that increasing a distance between the marker 30d and the marker 30e on the first surface 20a makes it possible to separate the positions of the two marker images within the captured image. From the findings described above, the present inventors have focused on the normal directions of the markers 30 and found that, when an angle difference between the normal directions of the two markers 30 is small, the two marker images may be close to each other within the captured image in a specific posture.

Here, the normal direction of the marker 30 is defined as a direction perpendicular to the surface of the case body 20 on which the marker 30 is provided. For example, when the marker 30 is configured as an LED chip that is arranged parallel to the surface of the case body 20, the normal direction of the marker 30 may be defined as the optical axis center direction of the LED chip. Further, when the marker 30 includes a resin portion for diffuse emission in the emission port of a light guide pipe, the normal direction of the marker 30 may be defined as a line perpendicular to the contact surface of the center of a diffuse light emission surface.

Hence, in the input device 16 of the embodiment, when an angle difference between the normal directions of two markers 30 is less than a predetermined threshold value Ath, a distance (linear distance) between the two markers 30 is equal to or greater than a predetermined first distance D1. Note that the values of the threshold value Ath and the first distance D1 are determined by various types of conditions such as the resolution of the image sensing device 14. For example, under certain conditions, the threshold value Ath may be 35 degrees, and the first distance D1 may be 3 cm. When, in an example illustrated in FIG. 8, the angle difference between the normal directions of the marker 30d and the marker 30e is less than the threshold value Ath, the distance between the marker 30d and the marker 30e is equal to or greater than the first distance D1. In this way, even when the input device 16 is imaged in the direction of the arrow A, the information processing device 10 can recognize each of the two marker images within the captured image.

The present inventors have also obtained such findings that, since, in the imaging in the direction of the arrow A, the marker 30p on the second surface 20b is not imaged in the first place, a distance between the marker 30p and the marker 30d or the marker 30e on the first surface 20a is allowed to be shorter than the first distance D1. The present inventors found, from the findings described above, that, when an angle difference between the normal directions of two markers 30 is large, the two marker images are prevented from being (or are unlikely to be) close to each other within the captured image.

Figure 9:
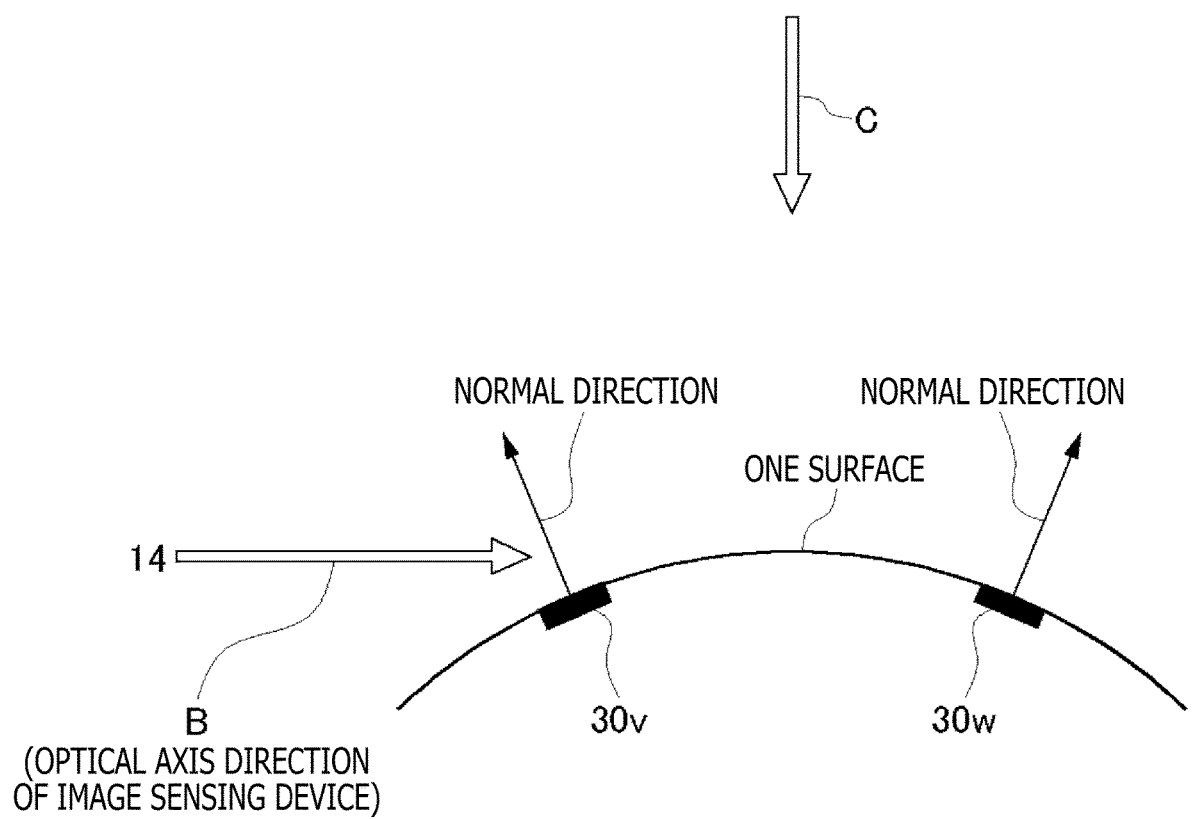
FIG. 9 is a diagram for illustrating the normal directions of two markers on the same surface.

FIG. 9 is a diagram for illustrating the normal directions of two markers 30 on the same surface. Here, illustrated is an example where a marker 30v and a marker 30w are provided on the same surface that is curved in a protruding shape with respect to the direction of imaging by the image sensing device 14. At this time, when the image sensing device 14 images the surface in a direction indicated by an arrow B, the marker 30v is imaged but not the marker 30w. This is caused by the fact that, since the surface where the markers are provided is curved in a protruding shape, the marker 30w on the back side with respect to the image sensing device 14 is hidden from the image sensing device 14 by a surface bulging between the marker 30v and the marker 30w.

Hence, when the angle difference between the normal directions of the two markers 30 on the same surface is large, even if the surface is imaged in the direction of the arrow B, the marker 30v is not imaged, with the result that the images of the two markers 30 are prevented from being close to each other within the captured image. Note that, for reference, when the image sensing device 14 shots the surface in a direction indicated by an arrow C, the image of the marker 30v and the image of the marker 30w are originally present in positions away from each other within the captured image, and thus the information processing device 10 can distinguish between the two markers without fail, with the result that the two marker images are prevented from erroneously being recognized as one marker image.

Therefore, in the input device 16, when an angle difference between the normal directions of two markers 30 is equal to or greater than the predetermined threshold value Ath, a distance (linear distance) between the two markers 30 is equal to or greater than a predetermined second distance D2. Note that, the second distance D2 is shorter than the first distance D1. The value of the second distance D2 is also determined by various types of conditions such as the resolution of the image sensing device 14, and for example, even when the distance between the image sensing device 14 and the input device 16 is the largest, the value of the second distance D2 is designed to be such a length that the two marker images can be distinguished within the captured image. For example, under certain conditions, the second distance D2 may be 2 cm. When, in the example illustrated in FIG. 8, the angle difference between the normal directions of the marker 30d and the marker 30p is equal to or greater than the threshold value Ath, the distance between the marker 30d and the marker 30p is equal to or greater than the second distance D2.

As described above, in the input device 16 of the embodiment, a distance between two markers 30 is designed based on an angle difference between the normal directions of the markers 30. In the design of the arrangement of the markers 30, the markers 30 are randomly arranged in a plurality of positions of the input device 16 whose three-dimensional shape is known, and whether such an arrangement is the optimal arrangement is checked by simulation or the like. Here, such conditions as the threshold value Ath described above are used in the simulation or the like, and thus optimal arrangement of the markers 30 can be realized.

The present invention has been described above based on the embodiment. The embodiment described above is illustrative, and a person skilled in the art would understand that various variations of the constituent elements thereof and the combination of processing processes are possible and that the variations are also within the scope of the present invention.

Although, in the embodiment, the arrangement of a plurality of markers 30 in the input device 16 including the operation members 22 is described, the device to be tracked does not necessarily need to include the operation members 22. In addition, although, in the embodiment, the image sensing devices 14 are attached to the HMD 100, the image sensing devices 14 may be attached to positions other than the HMD 100 as long as the image sensing devices 14 can image marker images.

INDUSTRIAL APPLICABILITY

The present invention relates to a device including a plurality of markers.

REFERENCE SIGNS LIST

1: Information processing system
10: Information processing device
14: Image sensing device
16: Input device
20: Case body
21: Grasping portion
22: Operation member
23: Curved portion
30: Marker

The invention claimed is:

1. A device comprising:
a case body; and
a plurality of markers configured to emit light to an outside of the case body,
wherein, when a calculated angle difference between a first normal direction of a first marker of the plurality of markers and a second normal direction of a second marker of the plurality of markers is less than a predetermined threshold value, a distance between the first marker and the second marker is equal to or greater than a predetermined first distance, and
wherein the first normal direction and the second normal direction are calculated determined using one or more images of the device.

2. The device according to claim 1,
wherein, when the angle difference is equal to or greater than a second predetermined threshold value, the distance between the first marker and the second marker is equal to or greater than a predetermined second distance, and the predetermined second distance is shorter than the first predetermined distance.

3. The device according to claim 1,
wherein a distance between the first marker and the second marker is designed based on the angle difference between the first marker and the second marker.

4. The device according to claim 1,
wherein the device is an input device including an operation member operated by a user.

5. The device according to claim 1,
wherein the case body includes a grasping portion grasped by the user, and
one or more of the plurality of markers are arranged on the grasping portion.

6. The device according to claim 1,
wherein the one or more images of the device is imaged with an image sensing device attached to a head-mounted display.

7. A method for determining orientation of a device comprising:
capturing an image of a first marker and a second marker on a case body of the device,
wherein the first marker and the second marker emit light;
determining a first normal direction for the first marker;
determining a second normal direction for the second marker; and
calculating an angle difference between the first normal direction and the second normal direction,
wherein, if the calculated angle distance is less than a predetermined threshold value, a distance between the first marker and the second marker is equal to or greater than a predetermined first distance, and
wherein, if the calculated angle difference is equal to or greater than a second predetermined value, the distance between the first marker and the second marker is equal to or greater than a predetermined second distance, and
wherein the predetermined second distance is less than the predetermined first distance.

* * * * *